United States Patent [19]
Guenthner

[11] 3,993,443
[45] Nov. 23, 1976

[54] NOXIOUS VAPOR SUPPRESSION USING GLASS MICROBUBBLES WITH A FLUOROSILANE OR POLYFLUOROSILOXANE FILM

[75] Inventor: Richard A. Guenthner, Birchwood, Minn.

[73] Assignee: Minnesota Mining and Manufacturing Company, St. Paul, Minn.

[22] Filed: June 25, 1974

[21] Appl. No.: 483,057

[52] U.S. Cl. .......................... 21/60.5 A; 21/60.5 R; 23/293 S; 252/385; 428/405; 428/406
[51] Int. Cl.² .............................................. B01J 1/18
[58] Field of Search ................... 21/60.5 R, 60.5 A; 169/43–47; 252/382, 385; 428/405, 406; 23/293 S

[56] References Cited
UNITED STATES PATENTS

| | | | |
|---|---|---|---|
| 2,640,063 | 5/1953 | Kohl | 21/60.5 R |
| 3,110,614 | 11/1963 | de Vries | 428/406 X |
| 3,146,060 | 8/1964 | Canevari | 21/60.5 R |
| 3,518,047 | 6/1970 | Alsgaard | 21/60.5 R |
| 3,621,917 | 11/1971 | Rosen | 169/44 |
| 3,677,347 | 7/1972 | Rosen | 169/44 |
| 3,927,975 | 12/1975 | Sumner | 21/60.5 A |

*Primary Examiner*—Norman Yudkoff
*Assistant Examiner*—Dale Lovercheck
*Attorney, Agent, or Firm*—Alexander, Sell, Steldt & DeLaHunt

[57] ABSTRACT

A liquid body of volatile inorganic chemical which reacts with water and evolves acidic vapor, such as liquid sulfur trioxide, is treated to suppress the evolution of said noxious vapors therefrom to the atmosphere by applying to the exposed surface of said liquid body a treating agent comprising glass microbubbles having on the surfaces thereof an adherent film resulting from the application to said surfaces of a fluoroaliphatic radical-containing material selected from the group consisting of fluorosilane or poly(fluorosiloxane).

7 Claims, No Drawings

NOXIOUS VAPOR SUPPRESSION USING GLASS MICROBUBBLES WITH A FLUOROSILANE OR POLYFLUOROSILOXANE FILM

This invention relates to a composition and method for controlling the evolution or release of noxious vapors, such as sulfur trioxide, from a liquid body of volatile chemical, such as liquid sulfur trioxide, oleum, or the like.

There are a number of chemicals which in their liquid state will freely evolve noxious vapors at ambient temperature. When such liquids are spilled or leaked from a tank, pipeline, etc., due to an accident or improper handling, they give rise to potential or immediate hazards of toxicity, irritation, or corrosion. For example, when liquid sulfur trioxide or oleum is exposed to atmosphere under ambient conditions, they evolve sulfur trioxide vapor which upon reaction with the moisture in the atmosphere produces a fume in a form of a dense, white smoke of sulfuric acid which is injurious when inhaled or upon contact with mucous membrane. Liquid sulfur trioxide or oleum, like many other strongly acidic liquids, will violently or explosively react upon contact with water, and the use of water to remove accidental spills or leaks of such liquids is frequently precluded as a means of handling such hazards. Generally it is necessary to handle such hazards by evacuating people from the accident site and either allow the evolved noxious vapor to dissipate (which normally will require a long period of time) or attempt to minimize further evolution of noxious vapor by treating the spill or leak with some type of neutralizing agent. In any event, the existing methods of treating such hazards are far from being as effective as desired, particularly in view of the increasing concern for the protection of the environment.

Briefly, in one aspect of this invention, the evolution of noxious vapors from a liquid body of volatile chemical, such as liquid sulfur trioxide or oleum, is controlled by applying to the exposed surface thereof a treating agent comprising glass microbubbles having on the surfaces thereof an adherent film derived from a fluoroaliphatic radical-containing silane or polysiloxane to form a layer of said microbubbles on top of the body of chemical to act as a barrier or blanket restraining or suppressing the free release or evolution of the noxious vapors therefrom to the atmosphere, so as to facilitate the ready disposal of the body of chemical. The manner of handling spills and leaks of vapor-generating liquid chemicals in accordance with this invention is a marked and significant improvement over present procedures of handling or combatting the hazards arising from the noxious vapors evolved from such chemicals.

Glass microbubbles (or microballoons) useful in this invention are hollow glass spheres which are strong, have low density, thin walls, low porosity and are free-flowing. They and their preparation are described, for example, in U.S. Pat. Nos. 3,585,157 and 3,365,315. Commercially available glass microbubbles useful in this invention are 3M Brand Glass Bubbles (e.g. types B25B, B30B, B40B, described in that company's bulletins GBIF-1(82.1)R, June 12, 1972, L-GBPBC-2(110.2)R, Dec. 1, 1970, and L-GBTD-2(23.3)R, Jan. 1, 1973, these microbubbles having diameters of 20–130 microns, wall thicknesses of 0.5–2.0 microns, and densities of 0.2 to 0.5).

The film of fluoroaliphatic radical-containing silane or polysiloxane can be applied to the surfaces of the glass microbubbles by spraying on or slurrying with the microbubbles a solution of silane or polysiloxane in a volatile solvent, e.g. ethanol, 1,1,1-trichloroethane, acetone, etc., and removal of the solvent thereafter. These silanes and polysiloxanes and their use in treating glass surfaces to form durable films thereon is known and this technology can be applied to make the treated glass microbubbles of this invention. The amount of adherent silane or polysiloxane on the microbubbles will be that amount sufficient to prevent rapid wetting of the surfaces of the microbubbles by the vapor-generating liquid chemical. Generally this amount will be about 0.2 to 5 weight percent based on the weight of the untreated microbubbles.

The amount of treated microbubbles used in this invention will be that amount sufficient to form a vaporsuppressing layer on the body of liquid chemical. Generally this amount will be that sufficient to form a layer of 2 to 25 or more millimeters thick.

The treated microbubbles used in this invention can be applied to the body of volatile liquid chemical as such or in the form of a slurry with a fluorinated aliphatic liquid or the treated microbubbles can be applied to a layer of the fluorinated liquid previously or simultaneously applied to the body of liquid chemical.

Fluoroaliphatic radical-containing silanes and polysiloxanes useful in this invention comprise silicon atoms bonded to 2 to 3 hydrolyzable groups or at least 2 oxygen atoms, and additionally bonded to at least one fluoroaliphatic radical by (or through) a divalent linking radical, and may be further bonded to a hydrocarbyl radical.

The fluoroaliphatic radical is generally a monovalent aliphatic radical. It can be straight chain, branched chain, and, if sufficiently large, cyclic, or combinations thereof, such as alkylcycloalkyl radicals. At least 75 percent of the non-catenary carbon valence bonds in the fluoroaliphatic radical are attached to fluorine atoms. The fluoroaliphatic skeletal chain can include catenary oxygen and/or trivalent nitrogen hetero atoms bonded only to carbon atoms, such hetero atoms providing stable linkages between fluorocarbon groups and not interfering with the inert character of the fluoroaliphatic moiety or radical. While the fluoroaliphatic radical can have a large number of carbon atoms, usually up to 20 carbon atoms will be adequate and preferred since larger radicals usually represent a less efficient utilization of fluorine than is possible with smaller fluoroaliphatic radicals. Generally, the fluoroaliphatic radical will have 3 to 20 carbon atoms, preferably 6 to about 12, and will contain 40 to 78 weight percent, preferably 50–77 weight percent, carbon-bonded fluorine. While the fluoroaliphatic radical can be completely fluorinated e.g. as in the case of $C_nF_{2n+1}$ radical, up to 25 percent of the substituents on the carbon chain can be non-ionic, non-polar substituents such as chlorine or hydrogen atoms, such substituents not adversely affecting the stability of the silane or polysiloxane molecule. The fluoroaliphatic radical, however, preferably has a terminal $XF_2C-$ group, where X is hydrogen, chlorine, or, preferably, fluorine. Representative fluoroaliphatic radicals are $CF_3(CF_2)_2-$, $HCF_2(CF_2)_3-$, $CF_3(CF_2)_7-$, $CF_3CF(CF_2Cl)(CF_2)_4-$, $CF_3CF_2OC_2F_4-$, and $$CF_3CF_2\overline{CF(CF_2)_4CF}-.$$

The hydrolyzable groups can be hydrogen, halogen, e.g. chlorine, or alkoxy or aryloxy, e.g. methoxy, ethoxy, phenoxy. The hydrocarbyl radicals are those free of nonaromatic unsaturation, such as alkyl, cycloalkyl, aryl, and combinations, e.g. methyl and phenyl.

The divalent linking radicals can be $$-\overset{O}{\underset{\|}{C}}O-R-\quad -\overset{O}{\underset{\underset{\|}{O}}{S}O}-R-\quad -\overset{O}{\underset{\|}{C}}NH-R-\quad -\overset{O}{\underset{\underset{\|}{O}}{S}NH}-R-\quad -\overset{O}{\underset{\underset{\|}{O}}{S}}-\overset{CH_3}{\underset{|}{N}}-R-\quad -NH-R-$$

$$-\overset{C_2H_5}{\underset{|}{N}}-R-\quad -O-R-\quad -CH_2O\overset{CH_3}{\underset{|}{CH}}CH_2O-R-\quad -\overset{O}{\underset{\|}{C}}OCH_2CH_2O-R-\quad -C_nH_{2n}-$$

$$-C_mH_{\overline{2m-8}} \quad \text{and} \quad -\overset{O}{\underset{\underset{\|}{O}}{S}}NHCH_2CH_2NH-R-$$

where R is $-C_nH-_{2n}$ or $C_mH_{2m-8}$, n is 2 to 12 and m is 6 to 12.

Fluoroaliphatic silanes and polysiloxanes of the above types are described, for example, in U.S. Pat. Nos. 3,423,234, 3,427,336, 3,442,664, 3,012,006, 2,979,519, and 3,422,131.

A class of fluorosilanes useful in this invention can be described by the formula $$R_f(Y)_bR-\overset{R'}{\underset{|}{Si}}(-R'')_2$$

where $R_f$ is a fluoroaliphatic radical as described above, Y is a divalent linking group as described above, b is zero or 1, R is $-C_nH_{2n}-$ or $-C_mH_{2m-8}$, where n and m are described above, R' is a hydrolyzable or hydrocarbyl radical as described above, or $R_f(Y)_bR-$, and R'' is a hydrolyzable group as described above.

The fluorosilane of the preceding formula contains at least 50% by weight of fluoroaliphatic radical, $R_f$, and at least 25% by weight of carbon-bonded fluorine residing in said fluoroaliphatic radical.

A particularly useful fluorosilane, $C_8F_{17}SO_2N(C_2H_5)C_3H_6Si(OCH_3)_3$, used in Example 1 herein, can be prepared by the procedure shown in U.S. Pat. No. 3,012,006, Example 1, using $C_8F_{17}SO_2N(C_2H_5)CH_2CH=CH_2$ as the allyl intermediate, and reacting the resulting trichlorosilane with a slight excess of methanol, followed by solution of the trimethoxysilane in ethanol.

A class of poly(fluorosiloxanes) useful in this invention can be described by the formula $$\left[R_f(Y)_bR-\overset{R'''}{\underset{|}{Si}}-O-\right]_r$$

where $R_f$, Y, R, and b are as described above, R''' is $R_f(Y)_bR-$, H—, —O—, or is a hydrocarbyl radical as described above, and r is an integer of 2 or higher.

Typically these poly(fluorosiloxanes) are prepared in the conventional manner by hydrolysis of the above-described fluorosilanes, particularly those in which R' is a hydrocarbyl radical, $R_f(Y)_bR-$, or H—. The fluorine content of the poly(fluorosiloxanes) will be essentially the same as that of the fluorosilane precursors.

A particularly useful poly(fluorosiloxane) is that employed in Example 4 herein and it can be prepared as described in U.S. Pat. No. 3,423,234, Example A.

Glass microbubbles treated with the fluorosilanes and poly(fluorosiloxanes) provide effective suppression of noxious vapor or fumes over a period of hours or even days. By contrast, glass microbubbles treated with fluoroaliphatic materials such as $R_fCOOH$, $R_fSO_2N(C_2H_5)CH_2CH_2OPO(OH)_2$, or the chromium coordination complex of $R_fSO_2N(C_2H_5)CH_2COOH$, provide initial suppression of the vapors but the effectiveness of the suppression becomes less with time, apparently because films of such fluoroaliphatic material are destroyed or replaced by the vapors, while the adherent films of the fluorosilanes and poly(fluorosiloxanes) remain effective.

As mentioned above, the treated glass microbubbles can be used in conjunction with a fluorinated aliphatic liquid, the latter being relatively inert and stable with respect to the treated glass microbubbles and the liquid body of chemical and noxious vapors thereof, the fluorinated liquid usually being available as a mixture of compounds having such nature. The fluorinated liquid can be straight chained, branched or cyclic or a combination thereof, such as alkylcycloaliphatic. It can contain ethylenic unsaturation though it is preferably saturated. The skeletal chain of fluorinated liquid can include catenary oxygen and/or trivalent nitrogen hetero atoms bonded only to carbon atoms, such hetero atoms providng stable linkages between fluorinated groups and not interfering with the inert character of the fluorinated liquid. The fluorinated liquid can have from 6 to 100 or more carbon atoms, the maximum number of carbon atoms being dictated only by availability and the requirement that the fluorinated material remain liquid under conditions of use. Generally the fluorinated liquid will have a boiling point greater than about 55° C., preferably greater than about 75° C., and contain about 60 to 76 weight percent carbon-bonded fluorine. The fluorinated liquid can contain some hydrogen or chlorine, but preferably less than one half of the carbon-bonded substituent atoms will be hydrogen or chlorine, the remainder being fluorine.

Fluorinated liquids useful in this invention are known and readily available, usually as mixtures of fluorinated liquids. U.S. Pat. Nos. 3,250,807, 3,250,808, and 3,274,239 disclose fluorinated oils, made by polymerization of perfluoropropylene oxide, which can be stabilized, e.g. as disclosed in U.S. Pat. Nos. 3,214,478, 3,242,218, and 3,342,875, to provide fluorinated liquids useful in this invention, said stabilization converting functional or active end groups to inert carbon-bonded hydrogen or fluorine by reaction with fluorinating agent, protic bases, or ultraviolet radiation. U.S. Pat. Nos. 2,500,388, 2,519,983, 2,594,272, and 2,616,927 describe the preparation of inert, highly fluorinated compounds, such as hydrocarbons, ethers, and tertiary amines, said preparation involving electrochemical fluorination in anhydrous hydrogen fluoride medium. The inert, non-polar fluorocarbons disclosed in the invention described and claimed in U.S. Pat. No. 3,792,977 can be used as the fluorinated liquid component in this invention. Commercial fluorinated liquids useful in this invention are 3M Company's "Fluorinert" liquids, e.g. FC-40, FC-43, FC-48, FC-75, and FC-77, described in that company's bulletins Y-ILBG(R)(87-1)RC and Y-IFC-48(60.2)R.

Another type of material which can be used as the fluorinated liquid in this invention is chlorofluorinated liquids, e.g. the halogen-containing telomers described in U.S. Pat. No. 2,770,659. Fluorinated liquids of this type are commercially available as "Halocarbon" liquids, e.g. grades 0.8/100 and 1.84/100, having boiling points of 136° C and 206° C, respectively.

If desirable, the fluorinated liquid can be thickened to increase its viscosity and render it relatively immobile. A thickening agent useful for this purpose is a finely divided, unreactive, inorganic solid having a high surface area, such as submicroscopic fumed silica. A commercially available fumed silica particularly useful in the practice of this invention is sold under the trademark "CAB-O-SIL" (see Bulletin 2325/666 of the Cabot Corporation, Boston, Massachusetts).

The thickened fluorinated liquid can be prepared by adding the thickening agent to the fluorinated liquid and the mixture subjected to agitation or shear. The desired viscosity of the thickened fluorinated liquid will be primarily dependent upon the amount of thickening agent used and secondarily upon the degree or intensity of agitation or shear. The desired viscosity of the thickened fluorinated liquid will be that viscosity which will make the fluorinated liquid relatively immobile on the surface of the liquid body of vapor-generating chemical so as to sufficiently reduce the rate of flow of the evolved vapors through the thickened fluorinated liquid. Generally this viscosity is at least 1000 centipoises to as much as 200,000 centipoises or more, as measured at 23° C. by a rotating viscometer, e.g. a Brookfield viscometer, the preferred viscosity being in the range of about 10,000 to 30,000 centipoises. High viscosity, e.g. up to 1,000,000 centipoises, may be used but the rate of formation of a continuous layer of the thickened fluorinated liquid may be undesirably slow at these higher viscosities. Generally in order to obtain the desired viscosity in the thickened fluorinated liquid, the amount of thickening agent will be in the range of 0.01 to 5 percent, preferably 0.02 to 2 weight percent, based on the weight of the fluorinated liquid component.

The chemical liquids which are treated in the practice of this invention to control the evolution of noxious vapors therefrom are those chemicals which are normally liquid and volatile at ambient temperature. The chemicals will generally be inorganic and will be particularly those which form acidic vapors which react with water in an exothermic fashion, especially those which are reactive in an explosive or violent manner with water, such as liquid sulfur trioxide, oleum, sulfuryl chloride, sulfuryl bromide, phosphorous trichloride, phosphorous tribromide, phosphorous oxychloride, phosphorous oxybromide, silicon tetrachloride, dibromodichlorosilane, titanium tetrachloride, tin tetrachloride, antimony trichloride, bromine, and the like.

The body of chemical to be treated in accordance with this invention generally should be in a relatively static or contained condition and may be in the form of a pool, puddle, or spill in a sump, gutter, dike, moat, hollow, or depression. The amount of treating agent applied will be that sufficient to form a layer, e.g. 0.15 to 2.5 cm thick. Following the application of the treating agent, the body of chemical can be disposed of in any suitable fashion, such as by pumping to an appropriate reservoir or container. One particularly useful method of disposal will be to convert the body of chemical into a stable aqueous solution which can be safely and readily handled. Such an aqueous solution can be obtained without hazard by controlled spraying water, for example in the form of a mist on top of the layer of treating agent to safely absorb the noxious vapors as they are slowly emitted through the layer of treating agent. The water can be sprayed in this fashion until the bulk of the chemical is safely diluted so that conventional neutralization and disposal methods can be readily used.

Objects and advantages of this invention are illustrated in the following examples but the particular materials and amounts thereof, and other details, recited in these examples should not be construed to unduly limit this invention.

EXAMPLE 1

To a slurry of 20 g glass microbubbles (B25B, manufactured by the 3M Company) in 40 g ethanol was added 20 g of a 2 wt. % solution of $C_8F_{17}SO_2N(C_2H_5)C_3H_6Si(OCH_3)_3$ in ethanol. The mixture was dried in air over night to remove the ethanol, and the dried, treated microbubbles were then further dried in a 110° C oven for about 1 hour. The 100° C-dried treated microbubbles were then screened through a 35 mesh screen to remove lumps and obtain a dry, free-flowing, treated microbubble product containing 2 wt. % of the trimethoxysilane.

Sufficient dry, treated microbubbles were added to 100 cc liquid sulfur trioxide ("Sulfan" B) in a 250 cc glass beaker so that a layer about 4 mm thick of treated microbubbles floated on the top of the liquid. During the first 1-½ hours following addition of the microbubbles, the fuming of the static treated body of liquid sulfur trioxide slowly decreased. Three hours after addition of the microbubbles, only slight fuming was observed. After 4 hours, an occasional wisp of sulfur trioxide fume was observed, the amount of liquid in the beaker being about 75 cc. After 26 hours, no fuming was observed and the amount of liquid in the beaker was about 75 cc.

EXAMPLE 2

Twelve cc of a fluorocarbon mixture of $C_8F_{18}$ and $C_8F_{16}O$ was added to 100 cc liquid sulfur trioxide ("Sulfan" B) in a 250 cc beaker, resulting in only a slight decrease in the amount of sulfur trioxide fumes being generated. The 110° C-dried, treated microbubbles of Example 1 were then added in the same manner, the fuming immediately ceasing. After 4 hours, the amount of fumes observed was very slight and the amount of liquid in the beaker was still about 100 cc. After 26 hours, no fuming was observed and the amount of liquid in the beaker was about 95 cc.

EXAMPLE 3

Ten cc of the fluorocarbon mixture used in Example 2, thickened with 2 wt. % "CAB-O-SIL" M-5 fumed silica to a viscosity of 1500 cps, was added to 100 cc of liquid sulfur trioxide ("Sulfan" B) in a 250 cc beaker. Sufficient dried, treated microbubbles of Example 1 was sprinkled over the top of the fluorocarbon mixture to provide a layer of 4 mm thick microbubbles. The fuming diminished during the first hour after microbubble addition and after 2 hours no fumes were observed and the sulfur trioxide in the beaker had solidified.

EXAMPLE 4

A 110° C-dried, treated microbubble product was obtained as in Example 1 except that 40 g of a 1 wt. % solution of

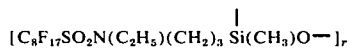

was used, the amount of polysiloxane on the dried microbubble product being 2 wt. %. Five cc of the fluorocarbon mixture used in Example 2 was added to 40 cc liquid sulfur trioxide ("Sulfan" B) in a 100 cc beaker, with some consequent decrease in fuming, followed by the addition of 20 cc of the above-described treated microbubbles. Marked reduction in the fuming of the liquid sulfur trioxide was observed over the first 2-½ hours after addition of microbubbles, at which time the amount of liquid in the beaker was about 30 cc. After 2-½ days, the amount of liquid in the beaker amounted to about 38 cc. When the light crust of microbubbles was broken with a spatula, slight fuming resulted.

EXAMPLE 5

Twenty cc of the above-treated microbubbles of Example 4 were added to 40 cc liquid sulfur trioxide in a 100 cc beaker. Immediately after addition, the body of liquid sulfur dioxide fumed significantly more than was observed in Example 4. After 2-½ hours, the crust formed on top of the body of microbubbles appeared dry, no significant fuming being noted and the amount of liquid in the beaker being about 32 cc. After 2-½ days, solid sulfur trioxide was observed at the interface between the liquid in the beaker (which measured about 42 cc) and the layer of microbubbles. Upon breaking the crust on top of the microbubbles, fumes of sulfur trioxide were observed.

I claim:

1. The method of suppressing the evolution of noxious acidic vapor into the atmosphere from a body of volatile, inorganic liquid chemical which reacts with water, which comprises applying to the surface of said liquid body of chemical a treating agent comprising glass microbubbles having on the surfaces thereof an adherent film resulting from the application to said surfaces of a fluoroaliphatic radical-containing material selected from the group consisting of fluorosilane or poly(fluorosiloxane), so as to reduce the rate of flow of said evolved vapor from said body of liquid chemical.

2. The method of claim 1 wherein said treating agent further comprises a fluorinated liquid.

3. The method of claim 1, wherein said fluoroaliphatic radical-containing material is a fluorosilane of the formula

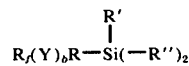

where $R_f$ is a fluoroaliphatic radical, Y is a divalent linking group, $b$ is zero or 1, R is $C_n H_{2n}$ or $C_m H_{2m-8}$ where $n$ is 2 to 12 and $m$ is 6 to 12, R' is a hydrolyzable group or hydrocarbyl radical or $R_f(Y)_bR$—, and R'' is a hydrolyzable group.

4. The method of claim 1, wherein said fluoroaliphatic radical-containing material is

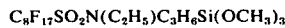

5. The method of claim 1, wherein said fluoroaliphatic radical-containing material is a poly(fluorosiloxane) of the formula

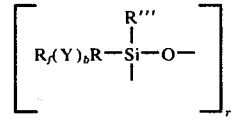

where $R_f$, Y, R and b are as defined in claim 4, R''' is $R_f(Y)_bR$—, H—, —O—, or a hydrocarbyl radical, and $r$ is 2 or greater.

6. The method of claim 1 wherein said fluoroaliphatic radical-containing material is a poly(fluorosiloxane) of the formula

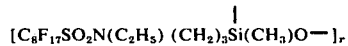

where $r$ is 2 or greater.

7. The method according to claim 1 wherein said chemical is liquid sulfur trioxide.

* * * * *

UNITED STATES PATENT AND TRADEMARK OFFICE
CERTIFICATE OF CORRECTION

PATENT NO. : 3,993,443
DATED : November 23, 1976
INVENTOR(S) : Richard A. Guentrner It is certified that error appears in the above-identified patent and that said Letters Patent are hereby corrected as shown below:

Column 2, lines 19 and 20, "vaporsuppressing" should read -- vapor suppressing --;

Column 7, line 47, "dioxide" should read -- trioxide --;

Column 8, line 42, "claim 4" should read -- claim 3 --.

Signed and Sealed this

Sixth Day of September 1977

[SEAL]

Attest:

RUTH C. MASON
*Attesting Officer*

LUTRELLE F. PARKER
*Acting Commissioner of Patents and Trademarks*